Figure 1:
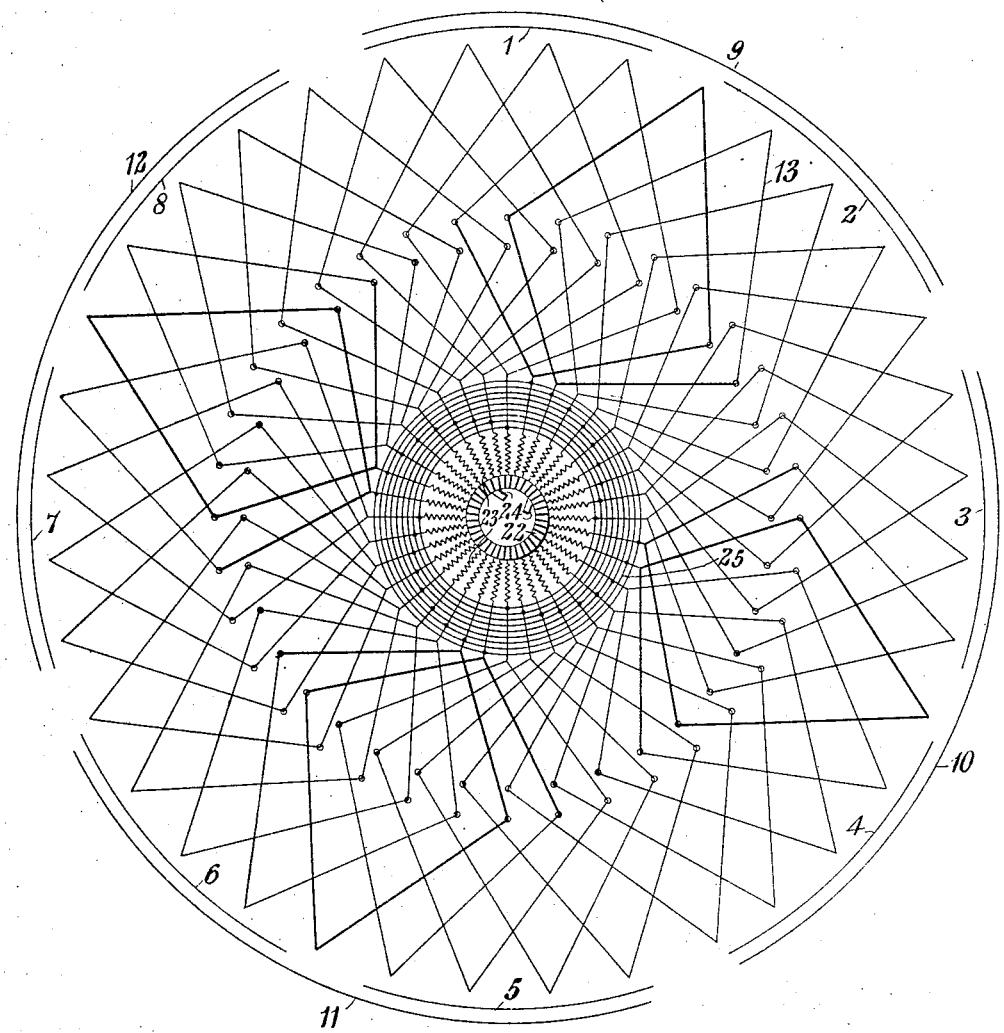

B. G. LAMME.
WINDING FOR ARMATURES OF DYNAMO ELECTRIC MACHINES.
APPLICATION FILED NOV. 3, 1906.

933,765.

Patented Sept. 14, 1909.
2 SHEETS—SHEET 1.

WITNESSES:
C. L. Belcher
Otto S. Schairer

INVENTOR
Benjamin G. Lamme
BY
Wesley G. Carr
ATTORNEY

B. G. LAMME.
WINDING FOR ARMATURES OF DYNAMO ELECTRIC MACHINES.
APPLICATION FILED NOV. 3, 1906.
933,765.
Patented Sept. 14, 1909.
2 SHEETS—SHEET 2.
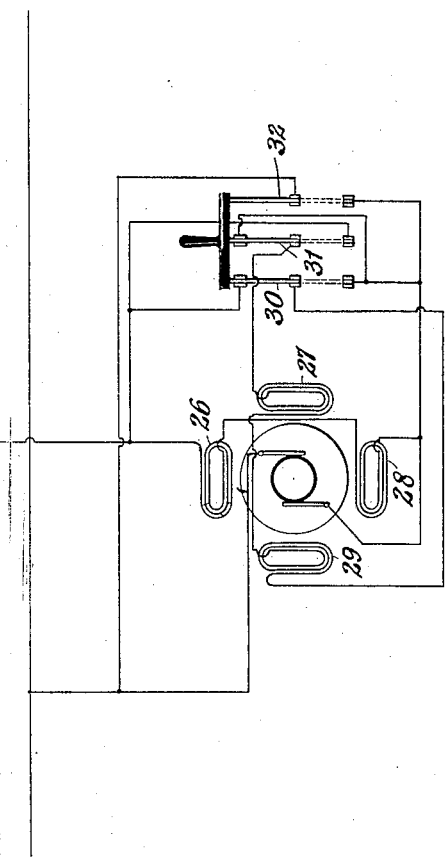
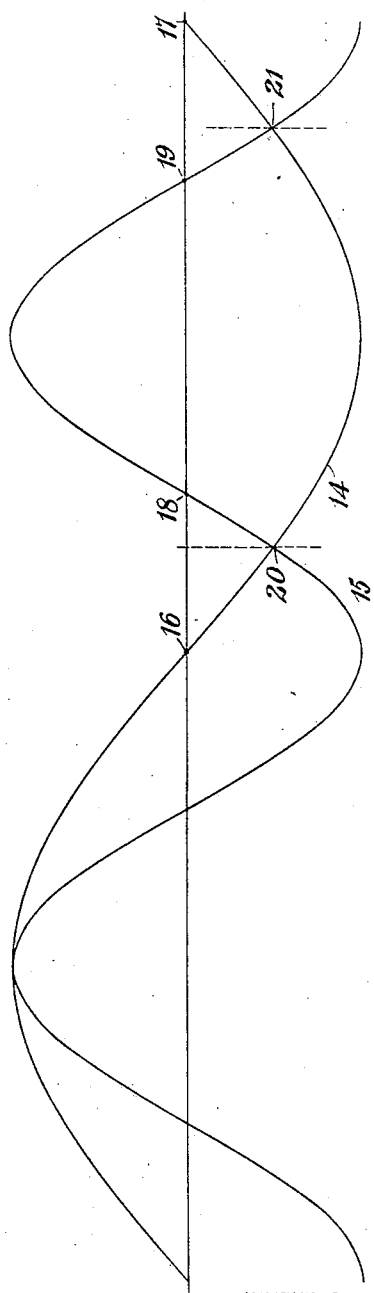
WITNESSES:
C. L. Belcher
Otto S. Schairer
INVENTOR
Benjamin G. Lamme
BY
Wesley G. Carr
ATTORNEY

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

WINDING FOR ARMATURES OF DYNAMO-ELECTRIC MACHINES.

932,765.  Specification of Letters Patent.  Patented Sept. 14, 1909.

Application filed November 5, 1908. Serial No. 461,064.

*To all whom it may concern:*

Be it known that I, BENJAMIN G. LAMME, a citizen of the United States, and a resident of Pittsburg, in the county of Allegheny and State of Pennsylvania, have invented a new and useful Improvement in Windings for Armatures of Dynamo-Electric Machines, of which the following is a specification.

My invention relates to armature windings for single-phase, alternating current motors, and particularly to windings for motors that are operated when starting as commutator motors having a given number of field poles and as induction motors with a different number of field poles at the higher speeds.

The object of my invention is to provide an armature winding that shall permit the most efficient operation of a motor of the character indicated, both as a commutator and as an induction motor.

Single-phase alternating current motors are sometimes started as commutator motors and are run at high speeds as induction motors, the armature windings being short-circuited in the latter instance so as to provide closed secondary circuits. It has also been proposed to change the number of field poles when changing from the commutator form to the induction form of motor, and to provide the armature winding with cross connections which connect points of normally equal potential when operating as a commutator motor and which short-circuit the armature winding when operating as an induction motor, such an arrangement being set forth in Patent No. 880,488.

The maximum speed and efficiency of operation of a motor is obtained when the pitch of the armature coils is equal to the polar pitch; i. e., when the angular distance between opposite sides of the coils is equal to the angular distance between the centers of adjacent poles—because the coils may then include the total amount of flux from a single field pole. If the number of field poles when operating as a commutator motor is double that when operating as an induction motor, these conditions for the most efficient operation of the motor either as a commutator motor or as an induction motor conflict; that is, if the pitch of the coil is equal to the polar pitch for the larger number of poles, which is the best pitch for operation as a commutator motor, each coil may then include only one-half of the total flux from a single field pole with the smaller number of poles. And, if the pitch of the coils is equal to the polar pitch for the smaller number of poles they may include the total flux from two adjacent poles of the larger number, the counter-electromotive force being zero. According to the present invention, the pitch of the armature coils is intermediate the polar pitches for the smaller and larger numbers of field poles, and is of such a value that the maximum electromotive forces obtainable in an armature winding that is arranged and employed as indicated, may be induced therein with both numbers of field poles.

In the present invention, conductors of comparatively high resistance are also employed to connect the terminals of the coils to the segments of the commutator cylinder in order to reduce the amount of sparking at the commutator when starting the motor, and, in order that these resistances may not be included in the secondary circuit when operating as an induction motor, the cross connecting conductors are connected to the ends of the resistance conductors that are remote from the commutator; that is, directly to the ends of the armature coils.

Figure 1 of the accompanying drawing, is a diagrammatic view of an armature winding that embodies my invention. Fig. 2 is a diagrammatic view of the circuits of a motor having an armature winding like that of Fig. 1, and Fig. 3 is a diagram illustrating curves that are useful in explaining the invention.

Located within the field of a motor, that may produce eight field magnet poles, as indicated by the lines 1, 2, 3, 4, 5, 6, 7 and 8, when starting and during low speed running, and four poles as indicated by the lines 9, 10, 11 and 12 for high speed running, is an armature having a winding that comprises a plurality of coils 13. The pitch of the coils, or the distance between their sides, may be so determined that the electromotive forces induced in the coils will be the maximum that is obtainable in a motor of the character here set forth, curves 14 and 15 of Fig. 3 providing convenient means whereby this determination may be effected. The curve 14 represents the variations in field strength for the smaller number of field poles, and the curve 15 for the larger number.

In order that maximum counter-electromotive forces may be induced in the armature coils when operating with four poles as an induction motor, the pitch of the armature coils should be equal to the distance between the points 16 and 17 which is half a wave length or the polar pitch, and in order that the maximum counter-electromotive force may be generated in the armature when operating with eight poles as a commutator motor, the pitch of the armature coils should be equal to one-half the wave length of the curve 15; i. e., equal to the distance between the points 18 and 19 or the polar pitch. It will be understood, however, that if the pitch of the armature winding were equal to the distance between the points 16 and 17 when the field produces eight poles, the coils would surround the total flux from two dissimilar field poles, and the counter-electromotive force would consequently be zero. If, on the contrary, the pitch of the armature coils were equal to the distance between the coils 18 and 19, only one-half of the flux from a field magnet would be surrounded by each armature coil. Consequently, the electromotive force induced therein when operating with four poles as an induction motor would be only one-half that induced therein if the pitch were equal to the distance between the points 16 and 17. The pitch which effects the best compromise between these conflicting conditions is determined by the distance between the points 20 and 21 where the two curves 14 and 15 cross each other, and this pitch will, under most conditions, be nearer in value to the ideal pitch for the larger number of poles than to the ideal pitch for the smaller number of poles as will be readily seen from Fig. 3, in which the curves of field variations are sine curves. That is, the pitch of the coils will also be less than half the sum of the polar pitches for the respective different numbers of poles. It will, of course, be understood that in practice the field curves may depart considerably from sine curves, the present case being assumed only for the purpose of illustrating the manner in which the pitch of the armature coils may be determined under given conditions.

The terminals of the armature coils are connected respectively to the segments of a commutator cylinder 22 by means of resistance conductors 23 that serve to limit the amount of current traversing the temporarily closed secondary circuits that are established when adjacent commutator segments are engaged by brushes 24. The terminals of armature coils that are correspondingly located with reference to field poles of like polarity, when operating with eight poles, are connected by means of cross connecting conductors 25, the said conductors serving to short-circuit the armature winding upon itself when operating with four poles as an induction motor. In order that the resistance conductors 23 may not be included in the closed secondary circuit, when operating as an induction motor, the cross connecting conductors are connected to the terminals of the resistance leads that are remote from the commutator; i. e., directly to the terminals of the armature coils.

The field magnet winding of the motor is divided into four groups of coils 26, 27, 28 and 29 that are connected in series-parallel relation and arranged so as to produce eight field poles for starting and slow speed running, and four poles for high speed running, the arrangement being governed by means of switches 30, 31 and 32 that may be and preferably are operated automatically as set forth in another application, Serial No. 341,885, filed of even date herewith by Frank Conrad, as assignor of the Westinghouse Electric & Manufacturing Company.

While I have shown and described my invention as employed in connection with a motor having eight poles for starting and four poles for running conditions, such numbers of poles have been selected merely for the purpose of illustration, and it will be readily understood that the invention may be employed in motors having other numbers of poles and in which the numbers of poles for starting and running conditions may bear other ratios than 1 to 2.

I claim as my invention:

1. The combination with a dynamo-electric machine having an armature and a field magnet winding in which the number of poles may be changed, of a winding for the armature comprising a plurality of coils the pitch of which is intermediate the polar pitches for the respective different numbers of poles.

2. The combination with a dynamo-electric machine having an armature and a field magnet winding in which the number of poles may be changed, of a winding for the armature comprising a plurality of coils the pitch of which is intermediate the polar pitches for the respective different numbers of poles but less than half the sum of the polar pitches for the respective different numbers of poles.

3. The combination with a dynamo-electric machine having an armature and a field magnet winding in which the number of poles may be changed, of a winding for the armature comprising a plurality of coils the pitch of which is intermediate the polar pitches for the respective different numbers of poles, and conductors that connect the terminals of coils that are of normally equal potential with the greater number of field poles.

4. The combination with a dynamo-electric machine having a commutator cylinder, an armature and a field magnet in which the number of poles may be changed, of a winding for the armature comprising a plurality of coils the pitch of which is intermediate the polar pitches for the respective different numbers of poles, resistance conductors that connect the coils to the commutator cylinder, and connections at the extremities of the resistance conductors remote from the commutator cylinder between terminals of the coils of normally equal potential with the greater number of field poles.

5. The combination with a dynamo-electric machine having a commutator cylinder, an armature and a field magnet in which the number of poles may be changed, of a winding for the armature comprising a plurality of coils, resistance conductors that connect terminals of the armature coils to the commutator cylinder, and conductors connected at the extremities of the resistance conductors remote from the commutator to the terminals of the armature coils that are of normally equal potential when the field has the larger number of poles.

In testimony whereof, I have hereunto subscribed my name this 31st day of October, 1906.

BENJ. G. LAMME.

Witnesses:
OTTO S. SCHAIRER,
BIRNEY HINES.